United States Patent
Korhonen et al.

(10) Patent No.: US 9,992,813 B2
(45) Date of Patent: Jun. 5, 2018

(54) METHOD AND APPARATUS FOR KEEP-ALIVE SIGNALLING

(75) Inventors: Jouni Korhonen, Riihimaki (FI); Markus Isomäki, Espoo (FI); Gabor Bajko, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 14/115,024

(22) PCT Filed: May 3, 2011

(86) PCT No.: PCT/IB2011/000950
§ 371 (c)(1),
(2), (4) Date: Oct. 31, 2013

(87) PCT Pub. No.: WO2012/150473
PCT Pub. Date: Nov. 8, 2012

(65) Prior Publication Data
US 2014/0078968 A1    Mar. 20, 2014

(51) Int. Cl.
*H04W 76/04* (2009.01)
*H04W 52/02* (2009.01)
(Continued)

(52) U.S. Cl.
CPC .......... *H04W 76/045* (2013.01); *H04L 69/28* (2013.01); *H04W 52/0229* (2013.01);
(Continued)

(58) Field of Classification Search
CPC ... H04L 69/28; H04L 61/2553; H04L 67/145; H04L 43/10; H04L 29/12471;
(Continued)

(56) References Cited

U.S. PATENT DOCUMENTS

| 6,212,175 B1 | 4/2001 | Harsch |
| 9,036,509 B1 * | 5/2015 | Addepalli ............. H04W 4/046 370/259 |

(Continued)

FOREIGN PATENT DOCUMENTS

EP    2088714    8/2009

OTHER PUBLICATIONS

International Search Report received for corresponding Patent Cooperation Treaty Application No. PCT/IB2011/000950, dated Jan. 31, 2012, 5 pages.

(Continued)

*Primary Examiner* — Jamal Javaid
*Assistant Examiner* — Rose Clark
(74) *Attorney, Agent, or Firm* — Alston & Bird LLP

(57) ABSTRACT

Various methods for determining network entity timeout values to improve keep-alive signaling are provided. One example method may comprise providing for transmission of a request for a timeout value associated with a keep-alive timer. The method of this example embodiment may further comprise receiving a response to the request, wherein the response comprises an indication of the timeout value of the keep-alive timer. Additionally, the method may further comprise determining an expiration time of the keep-alive timer based at least in part on the timeout value. The example method may further comprise providing for transmission of a keep-alive data packet prior to the determined expiration time. Similar and related example methods, example apparatuses, and example computer program products are also provided.

9 Claims, 7 Drawing Sheets

(51) Int. Cl.

| | | |
|---|---|---|
| H04W 8/26 | (2009.01) | |
| H04W 28/06 | (2009.01) | |
| H04L 29/06 | (2006.01) | |
| H04L 29/12 | (2006.01) | |

(52) U.S. Cl.
CPC ......... *H04W 76/04* (2013.01); *H04L 61/2553* (2013.01); *H04L 63/02* (2013.01); *H04W 8/26* (2013.01); *H04W 28/06* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/26* (2018.01)

(58) Field of Classification Search
CPC ......... H04L 67/14; H04L 69/16; H04L 63/02; H04W 76/045; H04W 28/06; H04W 76/068; H04W 80/06; H04W 72/04
USPC ........ 709/228, 227, 232, 224; 370/252, 401, 370/328, 254, 389
See application file for complete search history.

(56) References Cited

U.S. PATENT DOCUMENTS

| | | | | |
|---|---|---|---|---|
| 2003/0109272 | A1* | 6/2003 | Mousseau | H04L 29/06 455/517 |
| 2004/0264381 | A1* | 12/2004 | Banerjee | H04L 69/16 370/252 |
| 2007/0259673 | A1* | 11/2007 | Willars | H04W 52/0225 455/453 |
| 2007/0298848 | A1 | 12/2007 | Babin | |
| 2008/0209068 | A1* | 8/2008 | Herzog et al. | 709/232 |
| 2008/0225865 | A1* | 9/2008 | Herzog | H04W 76/045 370/401 |
| 2009/0083570 | A1* | 3/2009 | Shiraishi | H04L 69/28 713/600 |
| 2009/0197589 | A1* | 8/2009 | Kitazoe | 455/422.1 |
| 2009/0288139 | A1* | 11/2009 | Huber | G06Q 20/1235 726/2 |
| 2010/0124211 | A1* | 5/2010 | Payyappilly | H04L 65/1053 370/338 |
| 2010/0278101 | A1* | 11/2010 | Bengtsson et al. | 370/328 |
| 2010/0281118 | A1* | 11/2010 | Donahue et al. | 709/206 |
| 2010/0325306 | A1 | 12/2010 | Vimpari et al. | |
| 2011/0213820 | A1* | 9/2011 | Morris | H04L 69/16 709/201 |
| 2012/0008536 | A1 | 1/2012 | Tervahauta et al. | |
| 2012/0151085 | A1* | 6/2012 | Singh et al. | 709/232 |
| 2012/0209808 | A1* | 8/2012 | Tien | H04L 67/1095 707/622 |
| 2012/0258712 | A1* | 10/2012 | Rozinov | H04L 61/1535 455/435.1 |
| 2014/0059192 | A1* | 2/2014 | Miklos | H04W 8/082 709/221 |

OTHER PUBLICATIONS

Stiemerling et al., "NAT/Firewall NSIS Signaling Layer Protocol (NSLP)", Internet-Draft, NSIS Working Group, Apr. 27, 2010, pp. 1-98.
Levkowetz et al., "Mobile IP Traversal of Network Address Translation (NAT) Devices", RFC 3519, Network Working Group, Apr. 2003, pp. 1-34.
Soliman et al., "Mobile IPv6 Support for Dual Stack Hosts and Routers", RFC 5555, Network Working Group, Jun. 2009, pp. 1-41.
"3rd Generation Partnership Project; Technical Specification Group Core Network and Terminals; Non-Access-Stratum (NAS) Protocol for Evolved Packet System (EPS); Stage 3(Release 10)", 3GPP TS 24.301, V10.1.0, Dec. 2010, pp. 1-305.
"3rd Generation Partnership Project; Technical Specification Group Core Network and Terminals; Mobile radio interface Layer 3 specification; Core network protocols; Stage 3 (Release 10)", 3GPP TS 24.008, V10.1.0, Dec. 2010, pp. 1-625.
Extended European Search Report received for corresponding European Patent Application No. 11864818.7, dated Oct. 8, 2015, 9 pages.
"Enhancement to Keep Alive Mechanism for Uplink and Downlink TCP link", 3GPP TSG-GERAN2#37, GP-080195, Motorola, Feb. 18-22, 2008, 6 pages.
Holmberg, "Indication of Support for Keep-Alive", RFC 6223, Internet Engineering Task Force (IETF), Apr. 2011, pp. 1-18.
Droms, "Dynamic Host Configuration Protocol", RFC 2131, Network Working Group, Mar. 1997, pp. 1-39.
Alexander et al., "DHCP Options and BOOTP Vendor Extensions", RFC 2132, Network Working Group, Mar. 1997, pp. 1-44.
"3rd Generation Partnership Project; Technical Specification Group Core Network and Terminals; Non-Access-Stratum (NAS) protocol for Evolved Packet System (EPS); Stage 3 (Release 10)", 3GPP TS 24.301, V10.2.0, Mar. 2011, pp. 1-315.
"3rd Generation Partnership Project; Technical Specification Group Core Network and Terminals; Interworking Between the Public Land Mobile Network (PLMN) Supporting Packet Based Services and Packet Data Networks (PDN)(Release 10)", 3GPP TS 29.061, V10.2.0, Mar. 2011, pp. 1-155.
Written Opinion from corresponding International Patent Application No. PCT/IB2011/000950 dated Jan. 31, 2012.
Office Action from corresponding Chinese Patent Application No. 201180070619.4 dated Dec. 30, 2016.
Office Action from corresponding Chinese Patent Application No. 201180070619.4 dated Apr. 21, 2016.
Office Action from corresponding Chinese Patent Application No. 201180070619.4 dated Jun. 12, 2017, 10 pages.
Office Action from corresponding Chinese Patent Application No. 201180070619.4 dated Nov. 29, 2017, 4 pages.

* cited by examiner

METHOD AND APPARATUS FOR KEEP-ALIVE SIGNALLING

RELATED APPLICATION

This application was originally filed as PCT Application No. PCT/IB2011/000950 filed May 3, 2011.

TECHNICAL FIELD

Embodiments of the present invention relate generally to communication technology, and, more particularly, relate to a method, apparatus, and computer program product for determining network entity timeout values to improve keep-alive signaling.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. As a result, network protocols have advanced rapidly and have often increased the amount and complexity of communications between devices operating within the telecommunications infrastructure. At the same time, consumer demand has led to expectations of both smaller devices and greater functionality.

In response to these demands, network operators and device manufacturers have focused on improving efficiencies in device operation and information transfer. Some common concerns include reducing power consumption and decreasing radio network signaling. One example involving unnecessarily large amounts of signaling and high battery life consumption is maintaining connectivity through the use of transmitting dummy keep-alive packets.

Accordingly, it may be desirable to provide systems, methods, apparatuses, and computer program products for reducing unnecessary signaling and battery consumption through the use of improved keep-alive communications.

SUMMARY

In a network architecture employing stateful entities, such as a Network Address Translation (NAT) node or a firewall, and/or employing use of a Packet Data Protocol (PDP) context, periodic traffic with a terminal apparatus may be required to maintain a connection or session between the terminal apparatus and its external communication peers. The frequency of periodic traffic required may be determined in part by a keep-alive timer associated with a given entity or context. In some instances, a dummy packet with an empty payload may be sent by the terminal apparatus periodically to satisfy the entity's desire for traffic to maintain the connection. Such transmissions, however, may trigger radio channel allocation and release signaling on the radio interface, which may in turn create unnecessary traffic in the radio interface and increase the battery consumption of the terminal apparatus.

A terminal apparatus connected to one or more of these entities may therefore desire to determine the frequency of periodic traffic required. For example, a terminal apparatus may wish to send the least amount of data sufficient to keep the connection with the entity alive. A terminal apparatus may attempt to predict the expiration time of the keep-alive timer associated with the entity by gradually decrementing the frequency of traffic to the entity until the connection is dropped. This method, however, still requires a period of time where the terminal apparatus is learning the expiration time of the keep-alive timer and at least one disconnection. A terminal apparatus may also attempt to negotiate a timeout value for the keep-alive timer. This approach requires extra work negotiating the values and may not even be possible in certain circumstances based on the entity to which the terminal apparatus is connected. All of these implementations additionally require deployment of a specific Internet Engineering Task Force (IETF) protocol or are specific to a single application or protocol. Therefore, these approaches fail to provide a global solution. A need, therefore, exists to allow a terminal apparatus to reliably determine the actual timeout value associated with a given keep-alive timer using a global approach. Various embodiments of the invention described below seek to offer solutions to these issues.

Methods, apparatuses, and computer program products are herein provided for determining network entity timeout values to improve keep-alive signaling. Systems, methods, apparatuses, and computer program products in accordance with various embodiments may provide several advantages to computing devices, computing device users, and network providers. Some example embodiments advantageously enable a terminal apparatus to determine the exact timeout values for one or more keep-alive timers associated with, for example, a NAT node, firewall, or PDP context. In this regard, a terminal apparatus may be able to significantly reduce the amount of keep-alive data packets used to maintain a connection. As a result, the amount of traffic between the terminal apparatus and the serving network apparatus comprising the entities and/or context, as well as radio network signaling, may be reduced. Similarly, the terminal apparatus may significantly reduce battery consumption due to the reduced traffic. In accordance with some example embodiments, requesting and provisioning of the timeout values may be conducted by expanding or utilizing existing signaling methods, such as Third Generation Partnership Protocol (3GPP) Non-Access-Stratum (NAS) protocol (e.g. using new or existing Protocol Configuration Options (PCO), such as the PCO of the 3GPP NAS protocol), Dynamic Host Configuration Protocol (DHCP) version 4 or version 6, IPv6 Neighbor Discovery (ND) protocol (e.g. router solicitation (RS) and/or router advertisement messages). Therefore, implementation by the methods described in various embodiments of the invention may be simple and efficient in comparison with other techniques requiring additional negotiation.

In an example embodiment, a method is provided, which may comprise providing for transmission of a request for a timeout value associated with a keep-alive timer. The method of this example embodiment may further comprise receiving a response to the request. The response may comprise an indication of the timeout value of the keep-alive timer. The method of this example embodiment may additionally comprise determining an expiration time of the keep-alive timer based at least in part on the timeout value.

The method of this example embodiment may further comprise providing for transmission of a keep-alive data packet prior to the determined expiration time. In another embodiment, a computer program may be provided for executing the various operations of the example method.

In another example embodiment, an apparatus comprising at least one processor and at least one memory storing computer program code is provided. The at least one memory and stored computer program code may be configured, with the at least one processor, to cause the apparatus of this example embodiment to at least provide for transmission of a request for a timeout value associated with a keep-alive timer. The at least one memory and stored computer program code may be configured, with the at least one processor, to further cause the apparatus of this example embodiment to receive a response to the request. The response may comprise an indication of the timeout value of the keep-alive timer. The at least one memory and stored computer program code may be configured, with the at least one processor, to additionally cause the apparatus of this example embodiment to determine an expiration time of the keep-alive timer based at least in part on the timeout value. The at least one memory and stored computer program code may be configured, with the at least one processor, to further cause the apparatus of this example embodiment to provide for transmission of a keep-alive data packet prior to the determined expiration time.

In another example embodiment, a computer program product is provided. The computer program product of this example embodiment may comprise at least one computer-readable storage medium having computer-readable program instructions stored therein. The program instructions of this example embodiment may comprise program instructions configured to provide for transmission of a request for a timeout value associated with a keep-alive timer. The program instructions of this example embodiment may further comprise program instructions configured to receive a response to the request. The response may comprise an indication of the timeout value of the keep-alive timer. The program instructions of this example embodiment may further comprise program instructions configured to determine an expiration time of the keep-alive timer based at least in part on the timeout value. The program instructions of this example embodiment may further comprise program instructions configured to provide for transmission of a keep-alive data packet prior to the determined expiration time.

In another example embodiment, an apparatus is provided, which may comprise means for providing for transmission of a request for a timeout value associated with a keep-alive timer. The apparatus of this example embodiment may further comprise means for receiving a response to the request. The response may comprise an indication of the timeout value of the keep-alive timer. The apparatus of this example embodiment may further comprise means for determining an expiration time of the keep-alive timer based at least in part on the timeout value. The apparatus of this example embodiment may further comprise means for providing for transmission of a keep-alive data packet prior to the determined expiration time.

In an example embodiment, a method is provided, which may comprise establishing a timeout value for a keep-alive timer. The method of this example embodiment may further comprise receiving a request for the timeout value associated with the keep-alive timer. Furthermore, the method of this example embodiment may comprise determining the timeout value associated with the keep-alive timer. The method of this example embodiment may further comprise providing for transmission of a response. The response may comprise an indication of the timeout value associated with the keep-alive timer. In another embodiment, a computer program may be provided for executing the various operations of the example method.

In an example embodiment, an apparatus comprising at least one processor and at least one memory storing computer program code is provided. The at least one memory and stored computer program code may be configured, with the at least one processor, to cause the apparatus of this example embodiment to at least establish a timeout value for a keep-alive timer. The at least one memory and stored computer program code may be configured, with the at least one processor, to further cause the apparatus of this example embodiment to receive a request for the timeout value associated with the keep-alive timer. The at least one memory and stored computer program code may be configured, with the at least one processor, to further cause the apparatus of this example embodiment to determine the timeout value associated with the keep-alive timer. Furthermore, the at least one memory and stored computer program code may be configured, with the at least one processor, to cause the apparatus of this example embodiment to provide for transmission of a response. The response may comprise an indication of the timeout value associated with the keep-alive timer.

In another example embodiment, a computer program product is provided. The computer program product of this example embodiment may comprise at least one computer-readable storage medium having computer-readable program instructions stored therein. The program instructions of this example embodiment may comprise program instructions configured to establish a timeout value for a keep-alive timer. The program instructions of this example embodiment may further comprise program instructions configured to receive a request for the timeout value associated with the keep-alive timer. Furthermore, the program instructions of this example embodiment may comprise program instructions configured to determine the timeout value associated with the keep-alive timer. The program instructions of this example embodiment may comprise program instructions configured to provide for transmission of a response. The response may comprise an indication of the timeout value associated with the keep-alive timer.

In another example embodiment, an apparatus is provided, which may comprise means for establishing a timeout value for a keep-alive timer. The apparatus of this example embodiment may further comprise means for receiving a request for the timeout value associated with the keep-alive timer. The apparatus of this example embodiment may further comprise means for determining the timeout value associated with the keep-alive timer. The apparatus of this example embodiment may further comprise means for providing for transmission of a response. The response may comprise an indication of the timeout value associated with the keep-alive timer.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

Figure 5:
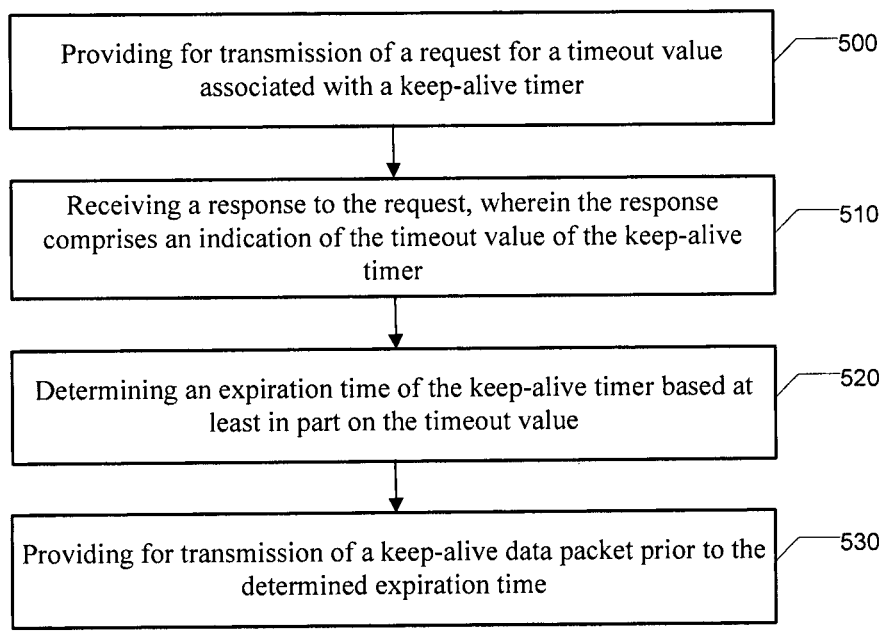
Figure 6:
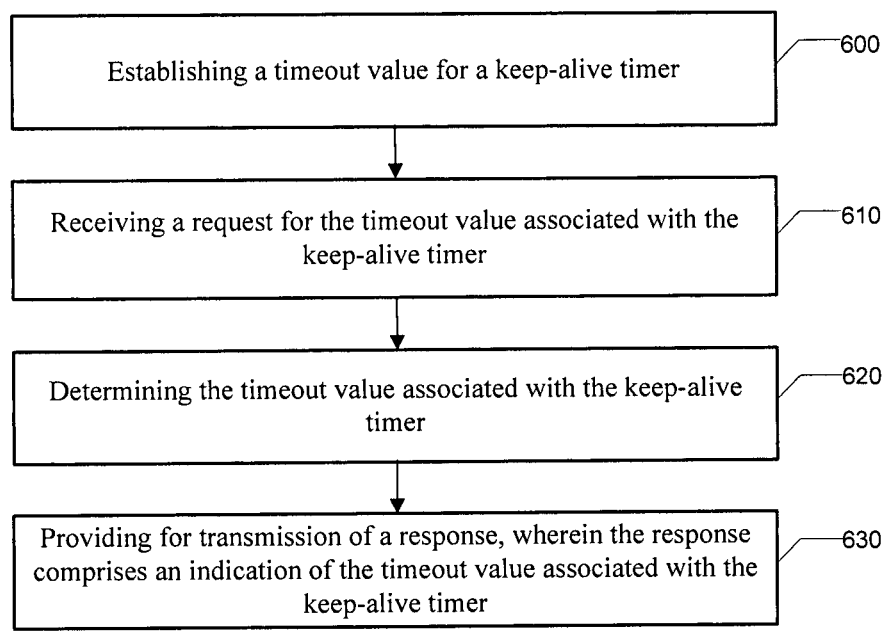

FIG. 5 illustrates a flowchart according to an example method for determining network entity timeout values to improve keep-alive signaling according to some example embodiments of the present invention; and FIG. 6 illustrates a flowchart according to an example method for determining network entity timeout values to improve keep-alive signaling according to some example embodiments of the present invention.

Figure 7:
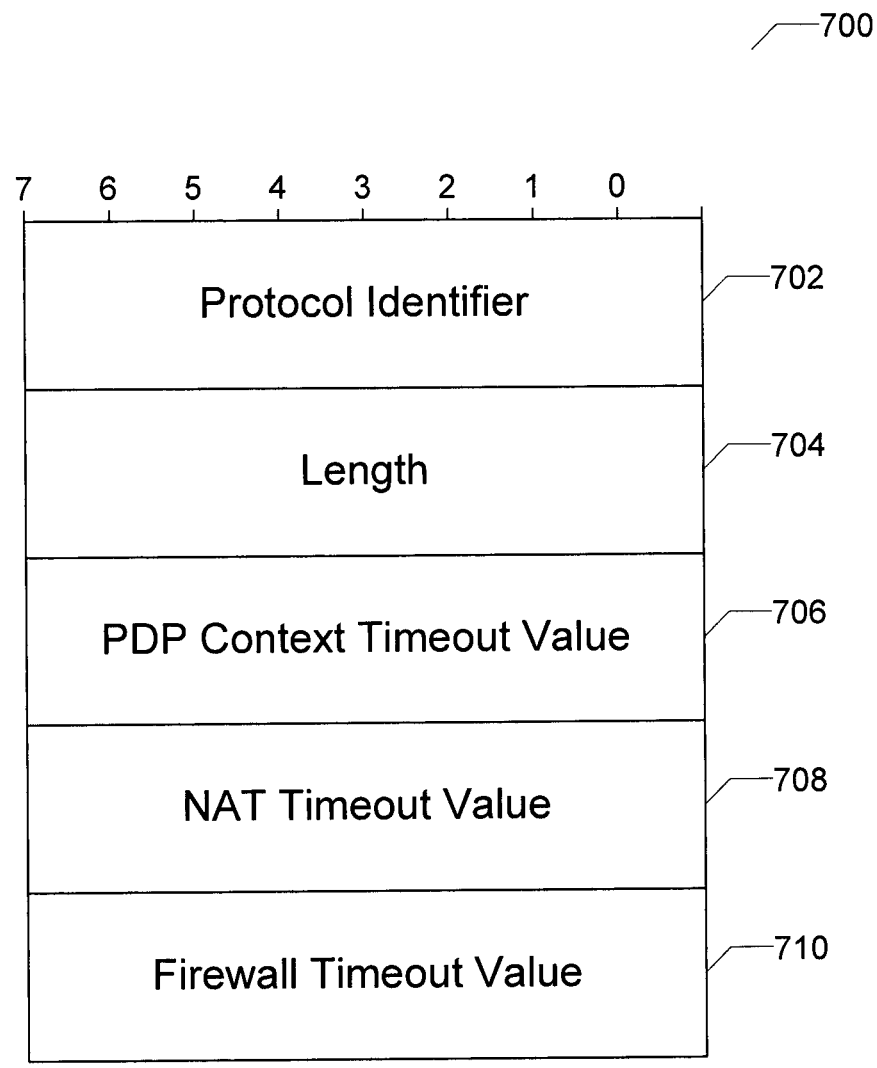

FIG. 7 is a schematic representation of a Protocol Configuration Options (PCO) according to some example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 1:
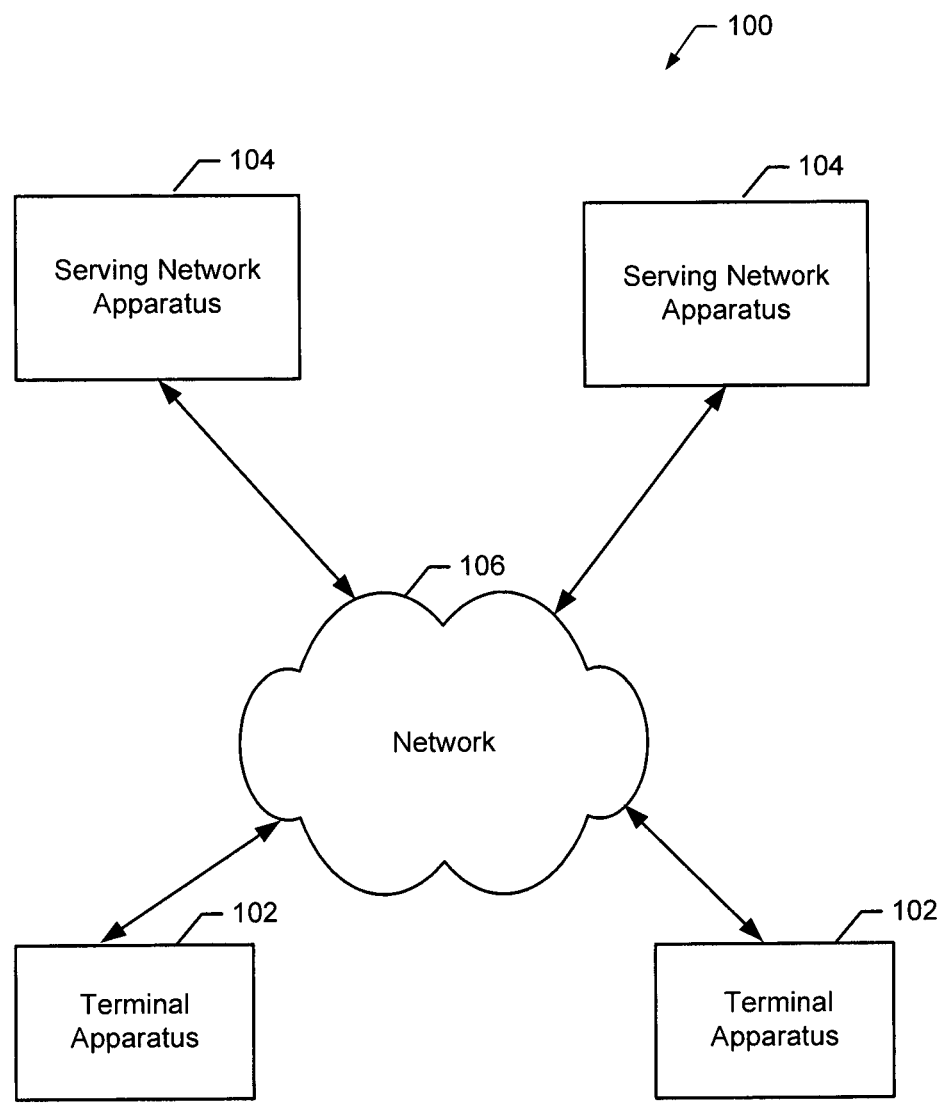
FIG. 1 illustrates a system for determining network entity timeout values to improve keep-alive signaling according to some example embodiments of the present invention.

Referring now to FIG. 1, FIG. 1 illustrates a block diagram of a system 100 for determining network entity timeout values to improve keep-alive signaling according to an example embodiment. It will be appreciated that the system 100 as well as the illustrations in other figures are each provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for determining network entity timeout values to improve keep-alive signaling, numerous other configurations may also be used to implement embodiments of the present invention.

The system 100 may include a plurality of terminal apparatuses 102 and a plurality of serving network apparatuses 104. The system 100 may further comprise a network 106. The network 106 may comprise one or more wireline networks, one or more wireless networks, or some combination thereof. The network 106 may, for example, comprise a serving network (e.g., a serving cellular network) for one or more terminal apparatuses 102. The network 106 may comprise, in certain embodiments, one or more of the terminal apparatuses 102 and serving network apparatuses 104 themselves. In some embodiments, the network 106 comprises a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) standards such as Global System for Mobile Communications (GSM), Long Term Evolution (LTE), and/or LTE Advanced (LTE-A), current and future implementations of International Telecommunications Union (ITU) International Mobile Telecommunications-Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more terminal apparatuses 102 may be configured to connect directly with one or more serving network apparatuses 104 via, for example, an air interface without routing communications via one or more elements of the network 106. Alternatively, one or more of the terminal apparatuses 102 may be configured to communicate with one or more of the serving network apparatuses 104 over the network 106. In this regard, the serving network apparatuses 104 may comprise one or more nodes of the network 106. For example, in some example embodiments, the serving network apparatuses 104 may be at least partially embodied on one or more computing devices that comprise an element of a radio access network (RAN) portion of the network 106. In this regard, the serving network apparatuses 104 may, for example, be at least partially embodied on an access point (for example, a macrocell, microcell, picocell, femtocell, closed subscriber group (CSG) cell, base station, base transceiver station (BTS), node B, evolved node B, and/or the like), a gateway (for example, Gateway GPRS (General Packet Radio Service) Support Node (GGSN), Public Data Network (PDN) Gateway (PDN-GW or PGW), a standalone Network Address Translation (NAT) node, a standalone firewall, or the like; which may, for example, be configured to provide access to the network 106 (e.g., via a radio uplink) to one or more of the terminal apparatuses 102. Accordingly, each of the serving network apparatuses 104 may comprise a network node or a plurality of network nodes collectively configured to perform one or more operations attributed to the serving network apparatus 104 as described with respect to various example embodiments disclosed herein.

A terminal apparatus 102 may be embodied as any computing device, such as, for example, a desktop computer, laptop computer, mobile terminal, mobile computer, mobile phone, mobile communication device, game device, digital camera/camcorder, audio/video player, television device, radio receiver, digital video recorder, positioning device, wrist watch, portable digital assistant (PDA), any combination thereof, and/or the like. In an example embodiment, a terminal apparatus 102 may be embodied as a mobile terminal, such as that illustrated in FIG. 2.

Figure 2:
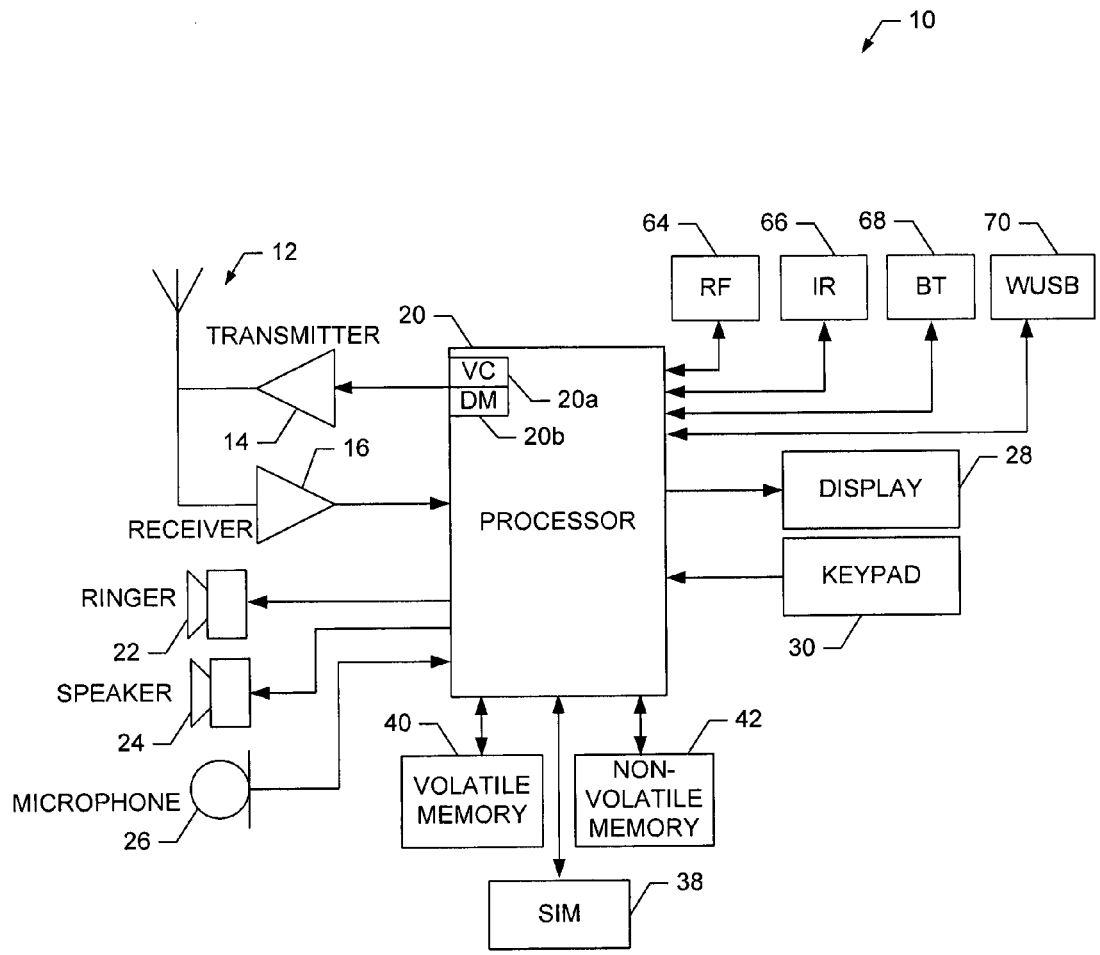
FIG. 2 illustrates a schematic block diagram of a mobile terminal according to some example embodiments of the present invention.

In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of terminal apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), GSM, IS-95 (Code Division Multiple Access (CDMA)), and/or the like. Also, for example, the mobile terminal may be capable of operating in accordance with 2.5G wireless communication protocols GPRS, Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as LTE, E-UTRAN and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20*a*, an internal data modem (DM) 20*b*, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
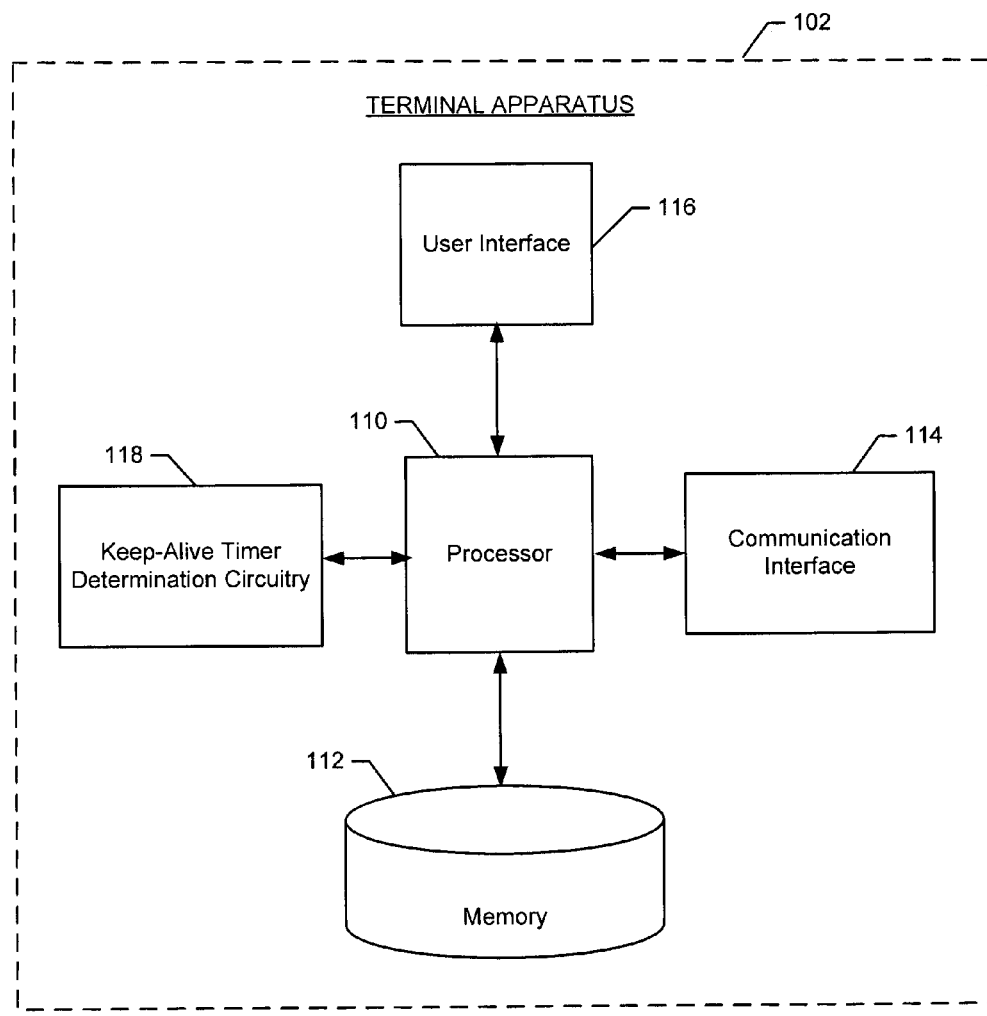
FIG. 3 illustrates a block diagram of a terminal apparatus according to some example embodiments of the present invention.

Referring now to FIG. 3, FIG. 3 illustrates a block diagram of a terminal apparatus 102 according to an example embodiment. In the example embodiment, the terminal apparatus 102 includes various means for performing the various functions herein described. These means may comprise one or more of a processor 110, memory 112, communication interface 114, user interface 116, or keep-alive timer determination circuitry 118. The means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or keep-alive timer determination circuitry 118 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 110 comprises a plurality of processors. The plurality of processors may be in operative communication with each other and may be collectively configured to perform one or more functionalities of the terminal apparatus 102 as described herein. The plurality of processors may be embodied on a single computing device or distributed across a plurality of computing devices collectively configured to function as the terminal apparatus 102. In embodiments wherein the terminal apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the terminal apparatus 102 to perform one or more of the functionalities of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the terminal apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 112 may comprise the volatile memory 40 and/or the non-volatile memory 42. The memory 112 may be configured to store information, data, applications, instructions, or the like for enabling the terminal apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the keep-alive timer determination circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 114 may be configured to enable communication between the terminal apparatus 102 and another device, such as another terminal apparatus 102. As a further example, the communication interface 114 may be configured to enable communication with a serving network apparatus 104 via the network 106. The communication interface 114 may additionally be in communication with the memory 112, user interface 116, and/or keep-alive timer determination circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or keep-alive timer determination circuitry 118, such as via a bus.

The keep-alive timer determination circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the keep-alive timer determination circuitry 118 is embodied separately from the processor 110, the keep-alive timer determination circuitry 118 may be in communication with the processor 110. The keep-alive timer determination circuitry 118 may further be in communication with one or more of the memory 112, communication interface 114, or user interface 116, such as via a bus.

In some example embodiments, the keep-alive timer determination circuitry 118 may be configured to connect to a network operating under a standard such as GSM, LTE, LTE-A, or the like. In this regard, the keep-alive timer determination circuitry 118 may be configured to connect to a serving network apparatus 104 embodied, for example, as a gateway such as a GGSN, PDN-GW, or the like. The serving network apparatus 104 may, in some embodiments, comprise a NAT and/or firewall. In other embodiments, the serving network apparatus 104 may be embodied as a standalone NAT and/or firewall. The NAT and/or firewall may be configured to release a binding with the terminal apparatus 102 associated with the keep-alive timer determination circuitry 118 if no traffic is received over a predetermined period of time. For example, the NAT and/or firewall may be configured to maintain one or more keep-alive timers with associated timeout values. In this regard, the binding may be released if a keep-alive timer reaches the respective timeout value prior to receiving any traffic from the connected terminal apparatus 102. According to certain embodiments, the NAT and/or firewall may have different timeout values for devices operating under User Datagram Protocol (UDP) versus Transmission Control Protocol (TCP) packets, Internet Protocol version 4 (IPv4) versus Internet Protocol version 6 (IPv6), or other similar opposing protocols and/or standards. Similarly, the NAT and/or firewall may have different timeout values for different port numbers used to connect with the NAT and/or firewall.

According to various embodiments, the serving network apparatus 104 may comprise a Packet Data Protocol (PDP) context data structure when the terminal apparatus 102 associated with the keep-alive timer determination circuitry 118 has an active session. The serving network apparatus 104 may be configured to deactivate the PDP context when no traffic is received from the terminal apparatus 102 associated with the keep-alive timer determination circuitry 118 over a predetermined period of time. For example, similar to the NAT and firewall embodiments described above, the serving network apparatus 104 may be configured to maintain one or more keep-alive timers with associated timeout values corresponding to the PDP context. In this regard, the PDP context may be deactivated if a keep-alive timer reaches the respective timeout value prior to receiving any traffic from the connected terminal apparatus 102. In some embodiments, the PDP context timeout value may correspond to a PDN connection lifetime value.

In example embodiments, the keep-alive timer determination circuitry 118 may be configured to send a request for information regarding the timeout values of one or more keep-alive timers. In this regard, the keep-alive timer determination circuitry 118 may be configured to provide for transmission of the request to a serving network apparatus 104, for example a serving network apparatus 104 comprising a NAT, firewall, and/or PDP context. The request may comprise, in certain embodiments, an indication of the timeout values desired, such as the timeout values associated with one or more NAT, firewall, and or PDP context keep-alive timers. As a non-limiting example, the request may comprise an indication of a desire to receive the timeout value related to both a NAT keep-alive timer and a PDP context keep-alive timer, but not a firewall timer.

The keep-alive timer determination circuitry 118 may be configured, in various embodiments, to provide for transmission of a request at the initial point of attachment with a serving network apparatus 104. In other embodiments, the keep-alive timer determination circuitry 118 may be configured to transmit a request at every new point of attachment with a serving network apparatus 104 during a particular session. For example, the keep-alive timer determination circuitry 118 may be configured to send a request when initially connecting to a serving network apparatus 104 in a home network, when transferring the connection to a serving network apparatus 104 in a roaming network, and when disconnecting from the serving network apparatus 104 in the roaming network apparatus and reconnecting to a serving network apparatus 104 in the home network.

According to various embodiments, the request may be provided for transmission by the keep-alive timer determination circuitry 118 via standard signaling. The request may be sent, in some embodiments, during GPRS or Evolved Packet System (EPS) bearer setup. In this regard, the keep-alive timer determination circuitry 118 may be configured to send the request via a cellular network specific protocol, such as 3GPP Non-Access-Stratum (NAS) protocol. For example, the keep-alive timer determination circuitry 118 may send the request via a Protocol Configuration Option (PCO). While a PCO is commonly used by a serving network apparatus 104 to communicate with a terminal apparatus 102, in some embodiments, a keep-alive timer determination circuitry 118 associated with a terminal apparatus 102 may be configured to use the PCO to communicate with the serving network apparatus 104. In other embodiments, the keep-alive timer determination circuitry 118 may be configured to send the request via an access specific protocol, such as Dynamic Host Configuration Protocol (DHCP) version 4 or version 6, IPv6 Neighbor Discovery (ND) protocol (e.g. a router solicitation (RS) message), and/or the like.

According to example embodiments, the keep-alive timer determination circuitry 118 may be configured to receive a response to the request, for example from a serving network apparatus 104. The response may be received, in some embodiments, via NAS (e.g. via a PCO). In other embodiments, the response may be received via DHCP, IPv6 ND (e.g. a router advertisement (RA) message), and/or the like.

The response received by the keep-alive timer determination circuitry 118 may comprise, in certain embodiments, one or more timeout values associated with one or more keep-alive timers. FIG. 7 provides a non-limiting example of a PCO 700 comprising the one or more timeout values. According to the example of FIG. 7, the PCO may be comprised of a sequence of octets (i.e. eight-bit values). In the example, the PCO may contain a keep-alive protocol identifier 702, a length value 704, one or more PDP context timeout values 706, one or more NAT timeout values 708, and one or more firewall timeout values 710. The keep-alive timer determination circuitry 118 may be configured, in certain embodiments, to provide for storage of the various timeout values for later reference.

In example embodiments, the keep-alive timer determination circuitry 118 may be configured to determine information related to one or more of the NAT, firewall, or PDP context based at least in part on the response. In some instances, the lack of response may provide additional information. For example, if the response received by the keep-alive timer determination circuitry 118 comprises one or more valid timeout values (e.g. non-zero values), such as for a NAT and/or firewall, the keep-alive timer determination circuitry 118 may determine that the serving network apparatus 104 providing the response comprises a respective NAT and/or firewall. In instances where the response comprises empty values (e.g. zero values), the keep-alive timer determination circuitry 118 may determine that the serving network apparatus 104 does not employ a NAT and/or firewall. If no response is received by the keep-alive timer determination circuitry 118, or if the response does not comprise, for example, a PCO related to timeout values, the keep-alive timer determination circuitry 118 may determine that the serving network apparatus 104 does not support reporting timeout values. For example, the serving network apparatus 104 may operate according to an early release of a related networking standard that does not support the reporting feature. In example embodiments, the PDP context timeout value may or may not be reported although it exists. The PDP context, in various embodiments, may be independent of the existence of a NAT or a firewall in the network.

According to various embodiments, the keep-alive timer determination circuitry 118 may be configured to determine the expiration time of the one or more keep-alive timers associated with the NAT, firewall, and/or PDP context. In this regard, the keep-alive timer determination circuitry 118 may be configured to maintain a record (e.g. a timestamp) of the time of the last communication provided for transmission. In some embodiments, the keep-alive timer determination circuitry 118 may determine the expiration time of a particular keep-alive timer based at least in part on a record of the last transmission associated with the keep-alive timer and the corresponding timeout value received and stored by the keep-alive timer determination circuitry 118. For example, the keep-alive timer determination circuitry 118 may be configured to add the timeout value to the corresponding timestamp of the last transmission to determine the expiration time. In some embodiments, the keep-alive timer determination circuitry 118 may be configured to provide for storage of each determined expiration time associated with the one or more keep-alive timers.

The keep-alive timer determination circuitry 118 may be configured, in example embodiments, to provide for transmission of a keep-alive data packet prior to the expiration time of a keep-alive timer. In this regard, the keep-alive timer determination circuitry 118 may be configured to transmit the keep-alive data packet to a serving network apparatus comprising a NAT, firewall, or PDP context having an associated keep-alive timer. The keep-alive data packet may comprise, for example, a dummy packet having an empty payload. In other embodiments, the keep-alive data packet may comprise an identifier distinguishing the packet as a keep-alive data packet. In some embodiments, the keep-alive timer determination circuitry 118 may be configured to transmit a separate keep-alive data packet for each of the one or more NAT, firewall, and/or PDP context keep-alive timers. The keep-alive timer determination circuitry 118 may be configured, according to certain embodiments, to update the stored expiration time corresponding to the respective keep-alive timer with a new expiration time based at least in part on the keep-alive data packet. For example, the keep-alive timer determination circuitry 118 may store a timestamp associated with the time at which the keep-alive data packet is sent. In this regard, the keep-alive timer determination circuitry 118 may be configured to calculate the new expiration time based on the timestamp of the keep-alive data packet and the timeout value associated with the respective keep-alive timer.

According to various embodiments, the keep-alive timer determination circuitry 118 may be configured to receive a request from an application for the timeout value of one or more keep-alive timers. For example, the request may identify one or more components, such as a NAT, firewall, and/or PDP context, for which the requesting application would like to receive a timeout value for the corresponding keep-alive timer. The request may, in some embodiments, be a query based on an Application Programming Interface (API) provided by the keep-alive timer determination circuitry 118. For example, the API may be a vendor specific API or an extension of an existing network API. In example embodiments, the keep-alive timer determination circuitry 118 may be configured to provide for transmission of the one or more requested timeout values to the requesting application.

Figure 4:
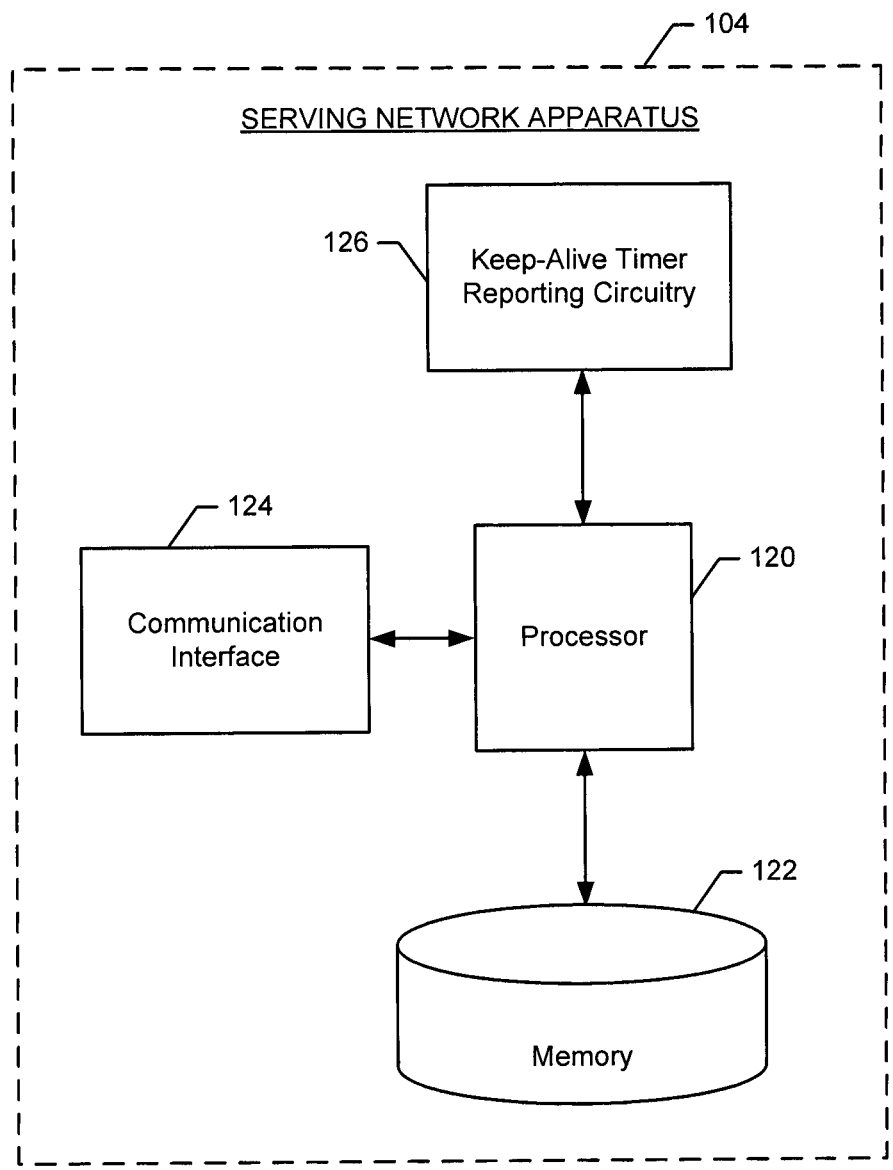
FIG. 4 illustrates a block diagram of a serving network apparatus according to some example embodiments of the present invention.

FIG. 4 illustrates a block diagram of a serving network apparatus 104 according to an example embodiment. In the example embodiment, the serving network apparatus 104 includes various means for performing the various functions herein described. These means may comprise one or more of a processor 120, memory 122, communication interface 124, or keep-alive timer reporting circuitry 126. The means of the serving network apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 122) that is executable by a suitably configured processing device (e.g., the processor 120), or some combination thereof.

In some example embodiments, one or more of the means illustrated in FIG. 4 may be embodied as a chip or chip set. In other words, the serving network apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, and/or keep-alive timer reporting circuitry 126 may be embodied as a chip or chip set. The serving network apparatus 104 may therefore, in some example embodiments, be configured to implement embodiments of the present invention on a single chip or as a single "system on a chip." As another example, in some example embodiments, the serving network apparatus 104 may comprise component(s) configured to implement embodiments of the present invention on a single chip or as a single "system on a chip." As such, in some cases, a chip or chipset may constitute means for performing one or more operations for providing the functionalities described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments the processor 120 comprises a plurality of processors. The plurality of processors may be in operative communication with each other and may be collectively configured to perform one or more functionalities of the serving network apparatus 104 as described herein. The plurality of processors may be embodied on a single computing device or distributed across a plurality of computing devices collectively configured to function as the serving network apparatus 104. In some example embodiments, the processor 120 is configured to execute instructions stored in the memory 122 or otherwise accessible to the processor 120. These instructions, when executed by the processor 120, may cause the serving network apparatus 104 to perform one or more of the functionalities of the serving network apparatus 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the serving network apparatus 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the serving network apparatus 104 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the keep-alive timer reporting circuitry 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the serving network apparatus 104 and one or more computing devices or computing resources may be in communication. As an example, the communication interface 124 may be configured to enable communication with a terminal apparatus 102 by the network 106, a radio uplink, and/or the like. The communication interface 124 may additionally be in communication with the memory 122, and/or keep-alive timer reporting circuitry 126, such as via a bus.

The keep-alive timer reporting circuitry 126 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the keep-alive timer reporting circuitry 126 is embodied separately from the processor 120, the keep-alive timer reporting circuitry 126 may be in communication with the processor 120. The keep-alive timer reporting circuitry 126 may further be in communication with one or more of the memory 122 or communication interface 124, such as via a bus.

According to various embodiments, the keep-alive timer reporting circuitry 126 may be associated with a serving network apparatus 104 comprising one or more of a NAT, firewall, and/or PDP context. The keep-alive timer reporting circuitry 126, in some embodiments, may be configured to establish a timeout value for one or more keep-alive timers associated with each NAT, firewall, and/or PDP context. Each timeout value, in some instances, may be configured by the keep-alive timer reporting circuitry 126 per Access Point Name (APN) or PDN.

The keep-alive timer reporting circuitry 126, according to example embodiments, may be configured to receive a request for one or more timeout values associated with keep-alive timers corresponding to a NAT, firewall, and/or PDP context. In this regard, the request may identify the keep-alive timers for which the timeout values are desired. The request may be received, for example, from a terminal apparatus 102 connected to the serving network apparatus 104 associated with the keep-alive timer reporting circuitry 126.

In example embodiments, the keep-alive timer reporting circuitry 126 may be configured to determine the requested timeout values. The keep-alive timer reporting circuitry 126, in various embodiments, may generate and provide for transmission of a response to the requesting terminal apparatus 102. The response may comprise the timeout values for the one or more keep-alive timers determined by the keep-alive timer reporting circuitry 126 corresponding to the request received from the terminal apparatus 102.

FIG. 5 illustrates a flowchart according to an example method for determining network entity timeout values to improve keep-alive signaling according to an example embodiment. In this regard, FIG. 5 illustrates operations that may be performed at a terminal apparatus 102. The operations illustrated in and described with respect to FIG. 5 may, for example, be performed by, with the assistance of, and/or under the control of one or more of the processor 110, memory 112, communication interface 114, or keep-alive timer determination circuitry 118. Operation 500 may comprise providing for transmission of a request for a timeout value associated with a keep-alive timer. The processor 110, memory 112, communication interface 114, user interface 116, and/or keep-alive timer determination circuitry 118 may, for example, provide means for performing operation 500. Operation 510 may comprise receiving a response to the request. The response may comprise an indication of the timeout value of the keep-alive timer. The processor 110, memory 112, communication interface 114, user interface 116, and/or keep-alive timer determination circuitry 118 may, for example, provide means for performing operation 510. Operation 520 may comprise determining an expiration time of the keep-alive timer based at least in part on the timeout value. The processor 110, memory 112, communication interface 114, user interface 116, and/or keep-alive timer determination circuitry 118 may, for example, provide means for performing operation 520. Operation 530 may comprise providing for transmission of a keep-alive data packet prior to the determined expiration time. The processor 110, memory 112, communication interface 114, user interface 116, and/or keep-alive timer determination circuitry 118 may, for example, provide means for performing operation 530.

FIG. 6 illustrates a flowchart according to another example method for determining network entity timeout values to improve keep-alive signaling according to an example embodiment. In this regard, FIG. 6 illustrates operations that may be performed at a serving network apparatus 104. The operations illustrated in and described with respect to FIG. 6 may, for example, be performed by, with the assistance of, and/or under the control of one or more of the processor 120, memory 122, communication interface 124, or keep-alive timer reporting circuitry 118. Operation 600 may comprise establishing a timeout value for a keep-alive timer. The processor 120, memory 122, communication interface 124, and/or keep-alive timer reporting circuitry 126 may, for example, provide means for performing operation 600. Operation 610 may comprise receiving a request for the timeout value associated with the keep-alive timer. The processor 120, memory 122, communication interface 124, and/or keep-alive timer reporting circuitry 126 may, for example, provide means for performing operation 610. Operation 620 may comprise determining the timeout value associated with the keep-alive timer. The processor 120, memory 122, communication interface 124, and/or keep-alive timer reporting circuitry 126 may, for example, provide means for performing operation 620. Operation 630 may comprise providing for transmission of a response. The response may comprise an indication of the timeout value associated with the keep-alive timer. The processor 120, memory 122, communication interface 124, and/or keep-alive timer reporting circuitry 126 may, for example, provide means for performing operation 630.

FIGS. 5-6 each illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 112, volatile memory 40, or non-volatile memory 42) of a mobile terminal, server, or other computing device (e.g., the terminal apparatus 102) and executed by a processor (e.g., the processor 110 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In one embodiment, a suitably configured processor (for example, the processor 110 and/or processor 120) may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium (for example, the memory 112 and/or memory 122), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   providing for transmission of a request for one or more timeout values associated with one or more respective keep-alive timers;
   receiving a response to the request, wherein the response comprises an indication of the one or more timeout values requested including the one or more timeout values associated with the one or more respective keep-alive timers;
   determining an expiration time of each respective keep-alive timer based at least in part on each respective timeout value, wherein the each respective keep-alive timer corresponds to a Network Address Translation node, a firewall, or a Packet Data Protocol context;
   providing for transmission of a keep-alive data packet prior to the determined expiration time;
   receiving a query from an application for a timeout value associated with the one or more keep-alive timers, wherein the query comprises an indication of the timeout value desired; and
   providing for transmission of the timeout value for a corresponding keep-alive timer to the application.

2. The method of claim 1, wherein providing for transmission of a request further comprises providing for transmission of the request via a method selected from a group consisting of Non-Access-Stratum Protocol, Dynamic Host Configuration Protocol, or Internet Protocol version 6 Neighbor Discovery Protocol.

3. The method of claim 1, wherein providing for transmission of a request further comprises providing for transmission of the request through a Protocol Configuration Option.

4. An apparatus comprising:
   at least one processor; and
   at least one memory comprising computer program code, the at least one memory and the computer program code configured to, with the at least one processor, cause the apparatus at least to:
   provide for transmission of a request for one or more timeout values associated with one or more respective keep-alive timers;
   receive a response to the request, wherein the response comprises an indication of the one or more timeout values requested including the one or more timeout values associated with the one or more respective keep-alive timers;
   determine an expiration time of each respective keep-alive timer based at least in part on each respective timeout value, wherein the each respective keep-alive timer corresponds to a Network Address Translation node, a firewall, or a Packet Data Protocol context;
   provide for transmission of a keep-alive data packet prior to the determined expiration time;
   receive a query request from an application for a timeout value associated with the one or more keep-alive timers, wherein the query comprises an indication of the timeout value desired; and
   provide for transmission of the timeout value for a corresponding keep-alive timer to the application.

5. The apparatus of claim 4, wherein in order to provide for transmission of a request the at least one memory and the computer program code are further configured to, with the at least one processor, cause the apparatus to provide for transmission of the request via a method selected from a group consisting of Non-Access-Stratum Protocol, Dynamic Host Configuration Protocol, or Internet Protocol version 6 Neighbor Discovery Protocol.

6. The apparatus of claim 4, wherein in order to provide for transmission of a request the at least one memory and the computer program code are further configured to, with the at least one processor, cause the apparatus to provide for transmission of the request through a Protocol Configuration Option.

7. A computer program product comprising a non-transitory computer-readable medium bearing computer program code embodied therein for use with a computer, the computer program code comprising:
   code for providing for transmission of a request for one or more timeout values associated with one or more respective keep-alive timers, wherein the request comprises an indication of the one or more timeout values desired;
   code for receiving a response to the request, wherein the response comprises the indication of the one or more timeout values desired including the one or more timeout values associated with the one or more respective keep-alive timers;
   code for determining an expiration time of each respective keep-alive timer based at least in part on each respective timeout value, wherein the each respective keep-alive timer corresponds to a Network Address Translation node, a firewall, or a Packet Data Protocol context;
   code for providing for transmission of a keep-alive data packet prior to the determined expiration time;
   code for receiving a query from an application for a timeout value associated with the one or more keep-alive timers, wherein the query comprises an indication of the timeout value desired; and
   code for providing for transmission of the timeout value for a corresponding keep-alive timer to the application.

8. An apparatus comprising:
   at least one processor; and
   at least one memory comprising computer program code, the at least one memory and the computer program code configured to, with the at least one processor, cause the apparatus at least to:

establish one or more timeout values associated with one or more respective keep-alive timers;

receive a request for the one or more timeout values associated with the one or more respective keep-alive timers, wherein the request comprises an indication of the one or more timeout values desired;

determine an expiration time associated with each respective keep-alive timer based at least in part on each respective timeout value, wherein the each respective keep-alive timer corresponds to a Network Address Translation node, a firewall, or a Packet Data Protocol context; and provide for transmission of a response, wherein the response comprises the indication of the one or more timeout values desired including the one or more timeout values associated with the one or more respective keep-alive timers.

9. The apparatus of claim 8, wherein in order to establish a timeout value for a keep-alive timer the at least one memory and the computer program code are further configured to, with the at least one processor, cause the apparatus to establish a separate timeout value for the one or more keep-alive timers for each Access Point Name.

* * * * *